United States Patent [19]
Sharki et al.

[11] 3,888,109
[45] June 10, 1975

[54] GAS DILUTION UNIT

[75] Inventors: Martin James Sharki; Clell D. Miller, both of Houston, Tex.

[73] Assignee: Dresser Industries, Inc., Dallas, Tex.

[22] Filed: Nov. 16, 1973

[21] Appl. No.: 416,532

[52] U.S. Cl. .................................. 73/23; 137/607
[51] Int. Cl.² ..................................... G01N 31/00
[58] Field of Search ........... 73/421 R, 23, 421.5 R, 73/422 R; 137/607

[56] References Cited
UNITED STATES PATENTS

| | | | |
|---|---|---|---|
| 3,032,053 | 5/1962 | Ross et al. | 137/607 X |
| 3,447,359 | 6/1969 | Kapff | 73/23 |
| 3,830,256 | 8/1974 | Cox | 137/606 X |

Primary Examiner—Charles A. Ruehl
Attorney, Agent, or Firm—Eddie E. Scott

[57] ABSTRACT

The present invention provides an apparatus that will selectively dilute a continuous sample of gas with a diluting gas at a multiplicity of predetermined ratios and will deliver the combination of sample gas and diluting gas to analyzing or measuring equipment at concentrations that are in the most effective range of said equipment. The sample gas and diluting gas are separately delivered to a valve means that will combine the sample gas and the diluting gas in a multiplicity of preselected ratios. The valve means may be actuated to change the ratio in which the sample gas and the diluting gas are combined. The combined sample gas and diluting gas are transmitted to the analyzing or measuring equipment.

4 Claims, 3 Drawing Figures

GAS DILUTION UNIT

BACKGROUND OF THE INVENTION

The present invention relates to gas chromatography and more particularly to an apparatus for combining a sample gas and a diluting gas in any one of a multiplicity of predetermined ratios.

Continuous gas flow analytical and measuring instruments that measure the effect on a detection device of the gas concentration passing it wherein the concentration depends only on the amount and type of gas entering a controlled total flow area have at least three serious limitations. First, the conventional millivolt meters used to measure the effect are not accurate over the entire range of 0 to maximum readings. Second, the effect on the detector reaches a peak at a particular air-gas ratio for each type of gas and the effect is reduced at higher concentrations of the gas. Third, the controlled flow of air through the detector cannot be changed without changing the response of the detector.

Although the first problem in the past has been compensated for by changes in circuitry to reduce the output reading to an accurate range of the meter and then multiplying the meter reading by the appropriate multiplier, the changes in circuitry have not been a satisfactory answer for all circumstances. The prior art has not had a completely satisfactory answer to the second problem and the third problem can be by-passed by a solution to the first two problems. Other problems of the prior art continuous gas flow analytical and measuring instruments are described in U.S. Pat. No. 3,447,359 to S. F. Kapff, patented June 3, 1969.

A need clearly exists for a continuous gas flow analytical and measuring instrument that will provide an accurate measurement of a gas for a wide range of gas concentrations. The instrument should be adapted for use by field personnel without the need for extensive calculations or adjustments.

The present invention gives a visual check on air flows and allows precision adjustments. Changes due to deposits or corrosion in fixed orifices or in calibrated valves do not invalidate the calculated ratios as in prior art systems since needle valve settings are made to flow metered standards and a visual check of the flow conditions can be made while the detector is in use. No prior laboratory calibration is necessary to prepare this system for accurate field measurements.

DESCRIPTION OF PRIOR ART

In U.S. Pat. No. 3,447,359 to S. F. Kapff, patented June 3, 1969, an air dilution attachment for explosive-gas analyzers is shown. The invention disclosed concerns a combination of a pneumatic bridge and a combustible detector. The pneumatic bridge, which is provided with a pressure differential detector that indicates a pressure imbalance in the bridge, mixes a gaseous sample and air together at a predetermined ratio. When the detector indicates an imbalance condition, an adjustable valve in the bridge provides means for regulating flow through the bridge so that the mix ratio remains constant.

In U.S.S.R. Pat. No. 208,330, a gas flow ratio controller to dilute gas for gas analyzers is shown. The controller relies on a flapper attached to a diaphragm to keep an equilibrium between the gas and the dilutant. Both gases flow through fine apertures to a mixer. By turning discs, the apertures can be changed. Pressure drop across the diaphragm can be set to 0 by an adjusting screw and a flat spring.

SUMMARY OF THE INVENTION

The present invention provides easily controlled air dilution of a sample gas stream being delivered to a measuring device to keep the concentration well below the maximum combustible mixture and within the range of maximum accuracy of the measuring device. By using the air-sample gas dilution ratio as a multiplier, the true concentration in the mixture may be given. A source of diluting gas or air and the source of the gas to be sampled are connected to a valve means. The valve means is adapted to selectively combine the gas to be sampled and the diluting gas in a multiplicity of different ratios. Means are provided for actuating the valve means to change the ratios. The combined sample gas and diluting gas are transmitted from the valve means to the measuring device. The above and other features and advantages of the present invention will become apparent from a consideration of the following detailed description of the invention when taken in conjunction with the drawings.

DETAILED DESCRIPTION OF THE INVENTION

Figure 1:
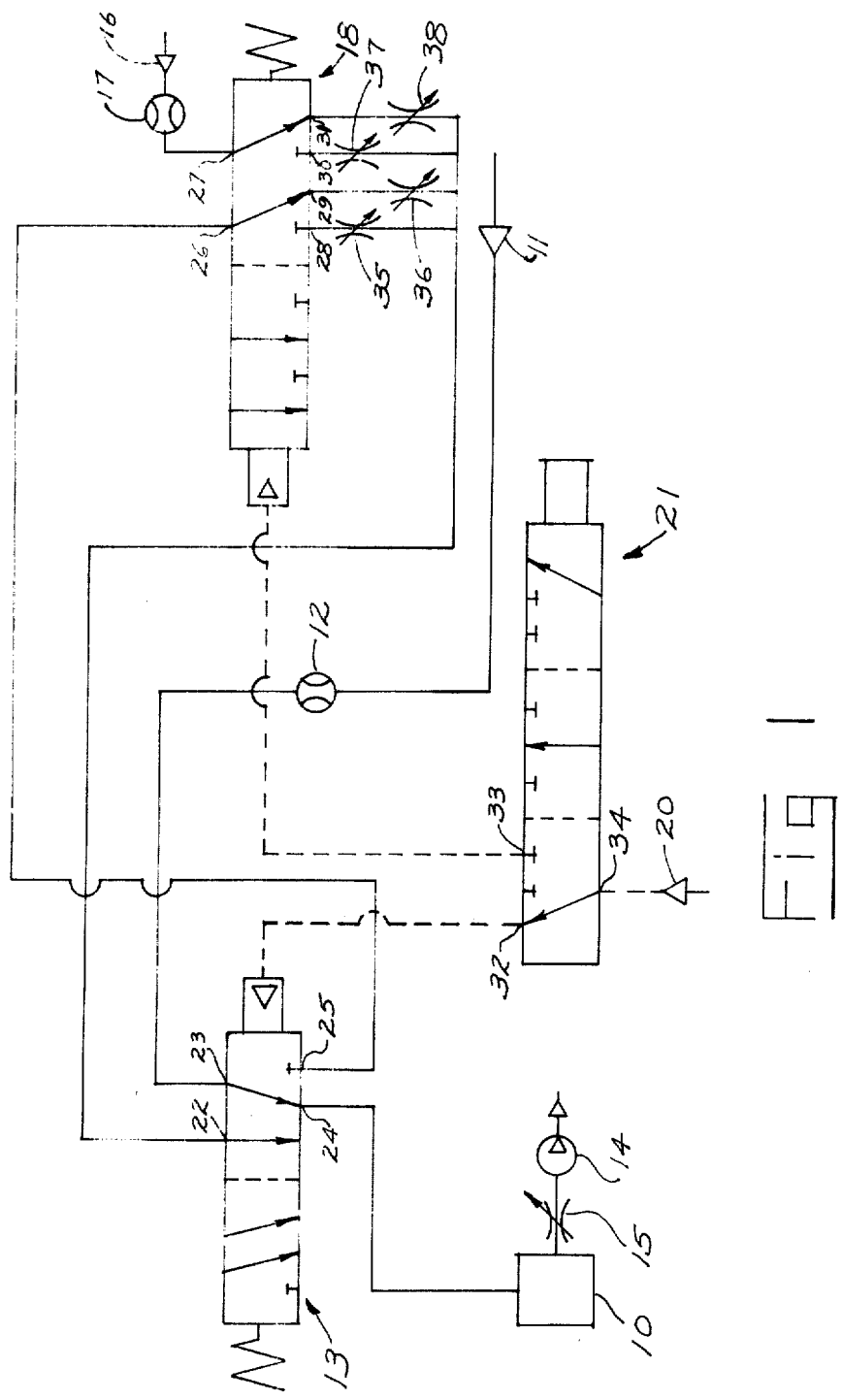
FIG. 1 is a schematic illustration of an apparatus constructed in accordance with the present invention.

Referring now to FIG. 1, a schematic illustration of an apparatus constructed in accordance with the present invention is shown. A sample gas is continuously delivered to a measuring device 10 from a source 11. The measuring device 10 may be a conventional measuring device and, for example, may be a device for measuring the combustibility of a gas. The flow of sample gas is measured by a flow measuring device 12 and the rate of flow may be adjusted by adjusting the needle valve 15. The sample gas is drawn through the measuring device 10 by a pump 14. The sample gas passes through a four-port four-way valve 13. The four-port four-way valve 13 is shown in an initial position wherein the flow of sample gas from source 11 is channeled from port 23 to port 24 and delivered directly to the measuring device 10. The line connected to port 22 is blocked by valve 13 and diluting gas is not combined with the sample gas.

A source 16 of diluting gas transmits diluting gas to a six-port four-way valve 18. A flow measuring device 17 measures the flow of diluting gas when the valves are set to permit such a flow. In the position shown in FIG. 1, the valve 18 transmits the diluting gas from port 27 to port 31 and the diluting gas is directed to port 22 of valve 13. Since valve 13 blocks the flow of diluting gas, the diluting gas is not combined with the sample gas.

A manually operated selector valve 21 controls the operation of valves 13 and 18 by directing a source 20 of pilot air to actuate the respective valves. In the position shown in FIG. 1, the selector valve 21 is in a position wherein pilot air delivered to port 34 is transmitted to port 32 and channeled to the valve 13 to maintain valve 13 in the position shown. The selector valve 21 may be moved to a neutral position wherein the flow of pilot air is blocked or to a position wherein pilot air is directed from port 34 to port 33 and channeled to valve 18.

Assuming, for example, that the needle valve 15 is set to allow flow of sample gas through the measuring device 10 at the rate of two cubic feet per hour and that the concentration of the sample gas is 32%. The 32% concentration may be above the maximum combustibility ratio of the gas and outside of the linear range of the measuring device 10. If the concentration of the sample gas is above the range of the measuring device, diluting gas must be combined with the sample gas. The concentration of the diluting gas-sample gas mixture should easily be determined and the determination should be precise. The present invention allows the sample gas and diluting gas to be combined in any one of a multiplicity of predetermined ratios by simply adjusting the selector valve 21.

Figure 2:
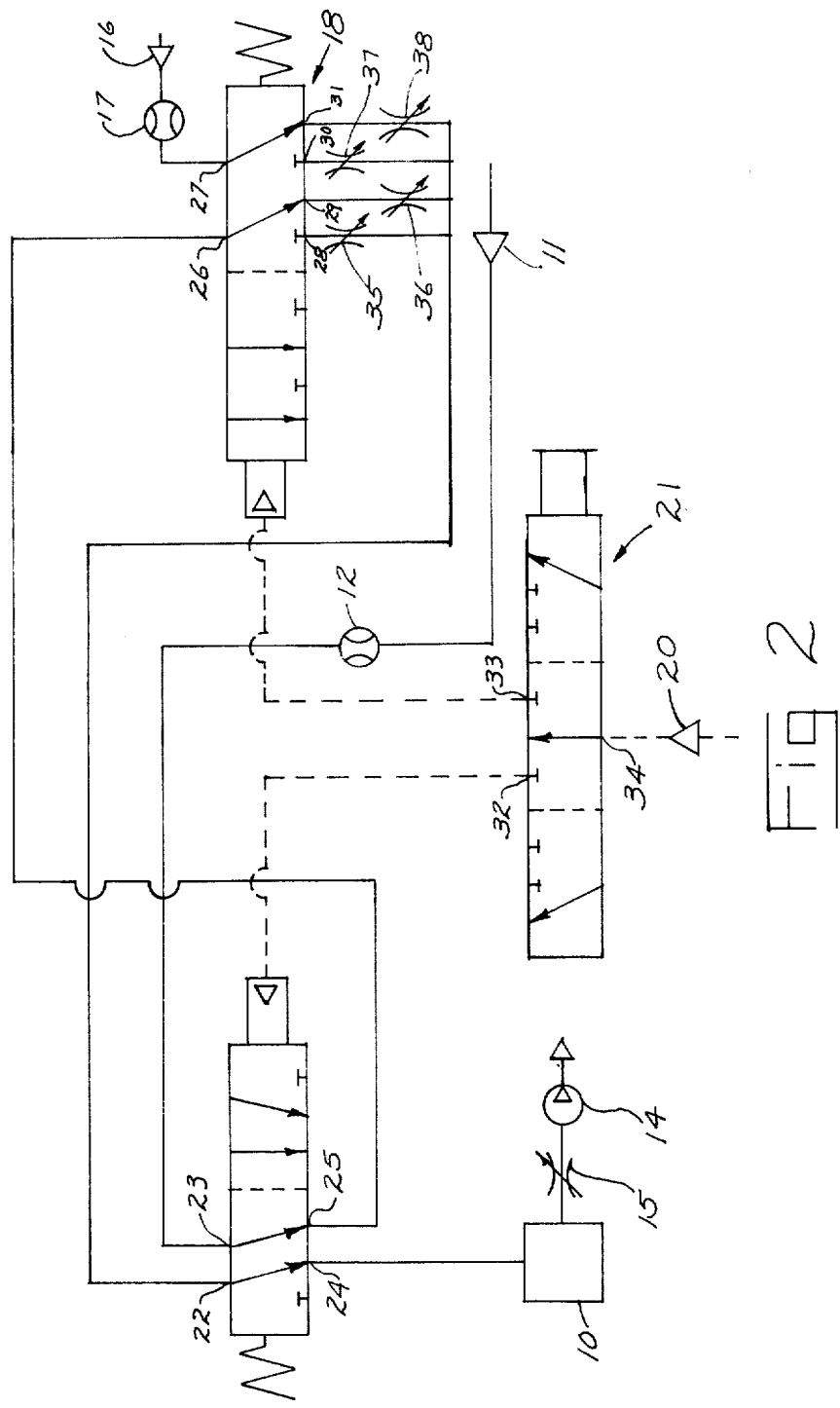
FIG. 2 is a schematic illustration of the apparatus shown in FIG. 1 with the valve means providing a different ratio of sample gas and diluting gas.

Referring now to FIG. 2, a schematic illustration of the FIG. 1 apparatus is shown with the sample gas and the diluting gas combined in a first ratio. The selector valve 21 has been moved to the center or neutral position thereby leaving both valves 13 and 18 unactivated. Valve 13 has returned to the unactivated position wherein gas entering port 22 is directed out port 24 and gas entering port 23 is directed out port 25. The valve 18 remains in the unactivated position shown in FIG. 1. The sample gas from source 11 enters port 23 of valve 13 and exits at port 25. The sample gas is diverted to port 26 of valve 18 and exits at port 29. The sample gas continues through needle valve 36. The diluting gas from source 16 enters valve 18 through port 27 and exits at port 31. The diluting gas passes through needle valve 38 and is combined with the sample gas that has passed through needle valve 36. The combined sample gas and diluting gas are transmitted to port 22 of valve 13 and exit at port 24. The combined sample gas and diluting gas are transmitted from valve 13 to measuring device 10.

According to the example discussed above, the needle valve 15 allows 2 cubic feet per hour to be transmitted through the measuring device 10. In order to provide the sample gas-diluting gas with a concentration within the range of the measuring device 10, the needle valve 38 is adjusted to provide 1.5 cubic feet per hour of diluting gas and the needle valve 36 is adjusted to allow .5 cubic feet per hour of the sample gas. The combined sample gas and diluting gas reaching the detector 10 will therefore contain one fourth of the concentration of the sample gas from source 11. The sample gas from source 11 had a concentration of 32%; therefore, the concentration of the combined sample gas and diluting gas reaching the measuring device 10 is 8% and is well under the maximum combustibility ratio and in the linear range of the measuring device 10.

It will be appreciated that the sample gas from source 11 may have a concentration greater than 32 % and must be diluted by an even greater ratio to be within the range of the measuring device 10. The FIG. 1 apparatus is shown in FIG. 3 with valves 13 and 18 providing an even greater ratio of sample gas and diluting gas.

Figure 3:
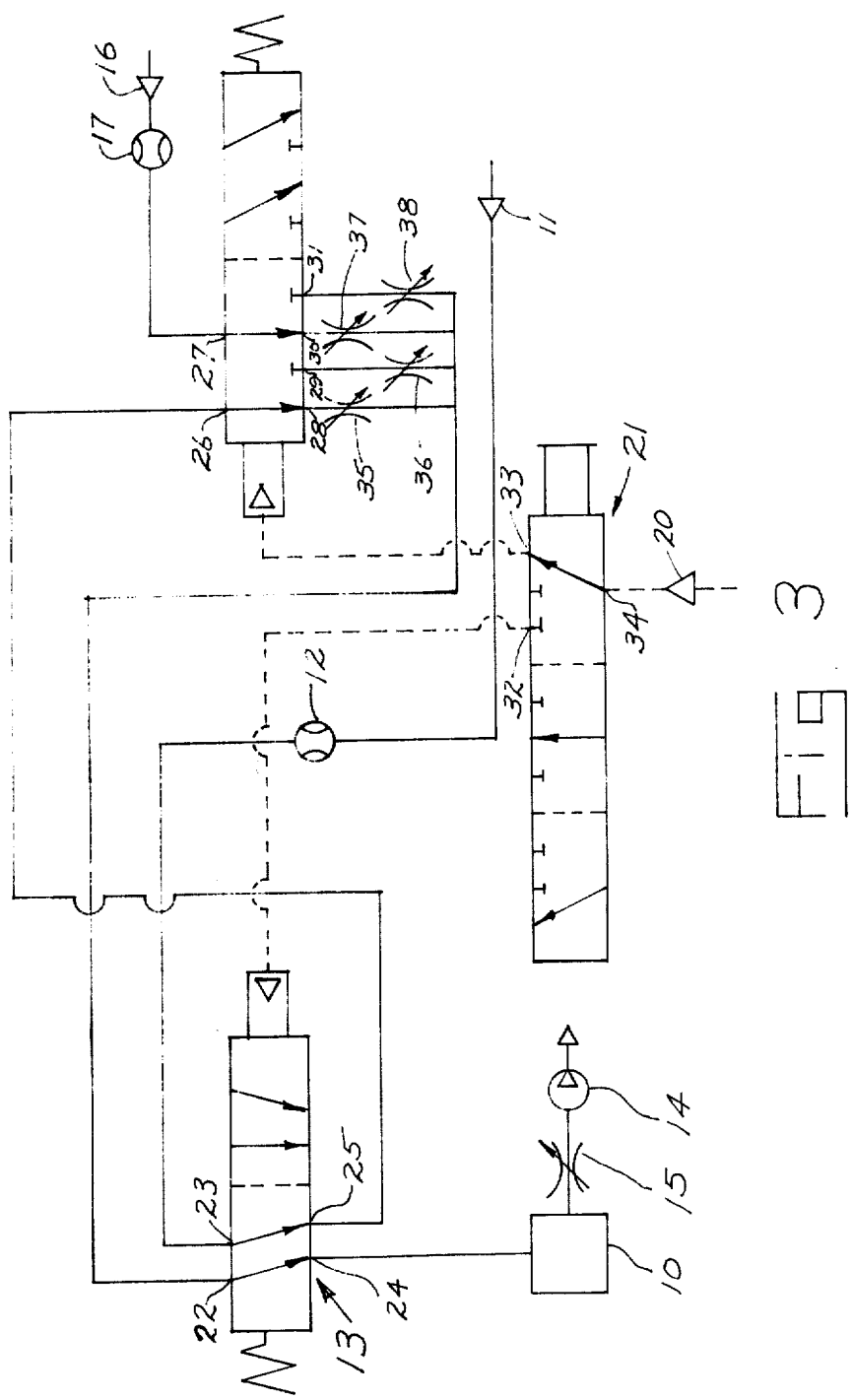
FIG. 3 is a schematic illustration of the apparatus shown in FIG. 1 with the valve means actuated to change the ratio of sample gas and diluting gas to a still different ratio.

Referring to FIG. 3, the selector valve 21 has been manually actuated to direct pilot air from source 20 through port 34 and out port 33 to the valve 18 thereby actuating valve 18. Valve 13 remains in the unactivated position shown in FIG. 2. The sample gas after passing through valve 13 enters valve 18 at port 26 and exits through port 28 passing through needle valve 35. The diluting gas from source 16 enters port 27 and exits at port 30 passing through needle valve 37 before it is combined with the sample gas. Assuming that the sample gas from source 11 has an initial concentration of 80%, the sample gas may be delivered to the measuring device 10 in an 8% concentration with the apparatus in the condition shown in FIG. 3. Needle valve 35 allows flow of .2 cubic feet per hour of the sample gas; whereas, needle valve 37 allows flow of 1.8 cubic feet per hour of the diluting gas. The initial concentration of the sample gas is 80% and the multiplier for the combined gases is 10; therefore, the concentration of the gas delivered to the measuring device 10 is 8% which is well under the maximum combustibility ratio and in the linear range of the device 10. It will be clear that the apparatus described can be given additional preset ratios by the addition of further multi-port valve assemblies or by substituting multi-position valves with additional ports.

The embodiments of the invention in which an exclusive property or privilege is claimed are defined as follows:

1. Apparatus for analyzing a sample gas that will provide analysis of said sample gas under conditions wherein the concentration of said sample gas may be above the range of known measuring devices, comprising:

measuring means for determining at least one characteristic of said sample gas,
a source of diluting gas,
a first flow control valve for providing flow at a first rate,
a second flow control valve for providing flow at a second rate, said second rate being related to said first rate by a first ratio,
a third flow control valve for providing flow at a third rate,
a fourth flow control valve for providing flow at a fourth rate, said fourth rate being related to said third rate by a second ratio and said second ratio being different than said first ratio,
a first valve having a first inlet port for receiving said sample gas, a second inlet port connected to said source of diluting gas, a first outlet port connected to said first flow control valve, a second outlet port connected to said second flow control valve, a third outlet port connected to said third flow control valve, and a fourth outlet port connected to said fourth flow control valve, for directing said sample gas from said first inlet port to said first outlet port and said first flow control valve and directing said diluting gas from said second inlet port to said second outlet port and said second flow control valve in a first position; and directing said sample gas from said first inlet port to said third outlet port and said third flow control valve and directing said diluting gas from said second inlet port to said fourth outlet port and said fourth flow control valve in a second position, means for combining said sample gas from said first control valve and said diluting gas from said second control valve and transmitting said combined gases to said measuring means;

means for combining said sample gas from said third flow control valve and said diluting gas from said fourth control valve and transmitting said combined gases to said measuring means, means for selectively moving said first valve to said first position and to said second position, a second valve for directing said sample gas to said first inlet port of said first valve in a first position and directing said sample gas directly to said measuring means in a second position, and means for selectively moving said second valve to said first position and to said second position.

2. The apparatus of claim 1 wherein said second valve for directing said sample gas to said first inlet port of said first valve in a first position and directing said sample gas directly to said measuring means in a second position comprises a first inlet port connected to said sample gas, a first outlet port connected to said first inlet port of said first valve, a second inlet port connected to said means for combining said sample gas from said first control valve and said diluting gas from said second control valve and transmitting said combined gases to said measuring means and to said means for combining said sample gas from said third flow control valve and said diluting gas from said fourth control valve and transmitting said combined gases to said measuring means, a second outlet port connected to said measuring means, and means for selectively moving said second valve to said first position and to said second position.

3. An apparatus for analyzing a gas that will provide analysis of said gas under conditions wherein the concentration of said gas may be above the range of known measuring devices, comprising:

a source of diluting gas, a first flow control valve for providing flow at a first rate, a second flow control valve for providing flow at a second rate, said second rate being related to said first rate by a first ratio, a third flow control valve for providing flow at a third rate, a fourth flow control valve for providing flow at a fourth rate, said fourth rate being related to said third rate by a second ratio and said second ratio being different than said first ratio, a mixing valve for combining said gas and said diluting gas, said mixing valve having a first inlet port for receiving said sample gas, a second inlet port for receiving said diluting gas, a first outlet port connected to said first flow control valve, a second outlet port connected to said second flow control valve, a third outlet port connected to said third flow control valve, and a fourth outlet port connected to said fourth flow control valve, for directing said gas from said first inlet port to said first outlet port and directing said diluting gas from said second inlet port to said second outlet port in a first position; and directing said sample gas from said first inlet port to said third outlet port and directing said diluting gas from said second inlet port to said fourth outlet port in a second position, means for transmitting said diluting gas to said second inlet port of said mixing valve, measuring means for determining at least one characteristic of said gas, means for combining said gas and diluting gas from said first, second, third, and fourth flow control valves, conduit means for transmitting the combined gas and diluting gas to said measuring means, a directing valve for directing said sample gas directly to said measuring means in a first position and to said first inlet port of said mixing valve in a second position, and selector means for selectively moving said directing valve to said first position or said second position.

4. Apparatus for analyzing a sample gas that will provide analysis of said sample gas under conditions wherein the concentration of said sample gas may be above the range of known measuring devices, comprising:

measuring means for determining at least one characteristic of said sample gas, a source of diluting gas, a first flow control valve for providing flow at a first rate, a second flow control valve for providing flow at a second rate, said second rate being related to said first rate by a first ratio, a third flow control valve for providing flow at a third rate, a fourth flow control valve for providing flow at a fourth rate, said fourth rate being related to said third rate by a second ratio and said second ratio being different than said first ratio, first valve means for directing said sample gas to said first flow control valve and said diluting gas to said second flow control valve in a first position and directing said sample gas to said third flow control valve and said diluting gas to said fourth flow control valve in a second position, first fluid pressure actuating means for selectively moving said first valve means to said first position and to said second position, means for combining said sample gas from said first control valve and said diluting gas from said second control valve and for combining said sample gas from said third flow control valve and said diluting gas from said fourth control valve, second valve means for directing said sample gas directly to said measuring means in a first position and for directing said sample gas to said first valve means in a second position, second fluid pressure actuating means for selectively moving said second valve means to said first position and to said second position, a source of fluid pressure, a valve for directing said fluid pressure to said first fluid pressure actuating means in a first position and to said second pressure actuating means in a second means, and manual means for selectively moving said second valve means to said first position and to said second position.

* * * * *